(12) United States Patent
Sasaki

(10) Patent No.: US 7,751,136 B2
(45) Date of Patent: Jul. 6, 2010

(54) LENS ASSEMBLY AND IMAGING APPARATUS

(75) Inventor: Naoki Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/403,874

(22) Filed: Mar. 13, 2009

(65) Prior Publication Data

US 2009/0244735 A1 Oct. 1, 2009

(30) Foreign Application Priority Data

Mar. 31, 2008 (JP) ............................. P2008-094047

(51) Int. Cl.
*G02B 7/02* (2006.01)

(52) U.S. Cl. ........................ 359/830; 359/819; 359/822; 396/25

(58) Field of Classification Search ................. 359/830, 359/819, 822; 396/25
See application file for complete search history.

(56) References Cited

U.S. PATENT DOCUMENTS

| 6,507,700 B1 | 1/2003 | Takekuma et al. |
| 2004/0179277 A1* | 9/2004 | Stallard et al. ............. 359/811 |

FOREIGN PATENT DOCUMENTS

JP 2002-90603 A 3/2002

* cited by examiner

*Primary Examiner*—Jordan M. Schwartz
*Assistant Examiner*—James C Jones
(74) *Attorney, Agent, or Firm*—Birch, Stewart, Kolasch & Birch, LLP

(57) ABSTRACT

In the lens assembly, ventilation channels 15*b*1, 15*c*1, 15*d*1, and 15*e*1 passing between an object-side opening 15_1 and an image-side opening 15_2 of a barrel 15 are formed by processing inner surfaces 15*b*, 15*c*, and 15*d* of the barrel 15 and a surface 15*e* of the barrel 15. Thereby, when a taking lens 11 of a first group having an O-ring 16 fitted thereto is mounted into the barrel 15, air in the barrel 15 is pushed out from the image-side opening 15_2 of the barrel 15 through the ventilation channels 15*b*1, 15*c*1, 15*d*1, and 15*e*1.

19 Claims, 13 Drawing Sheets

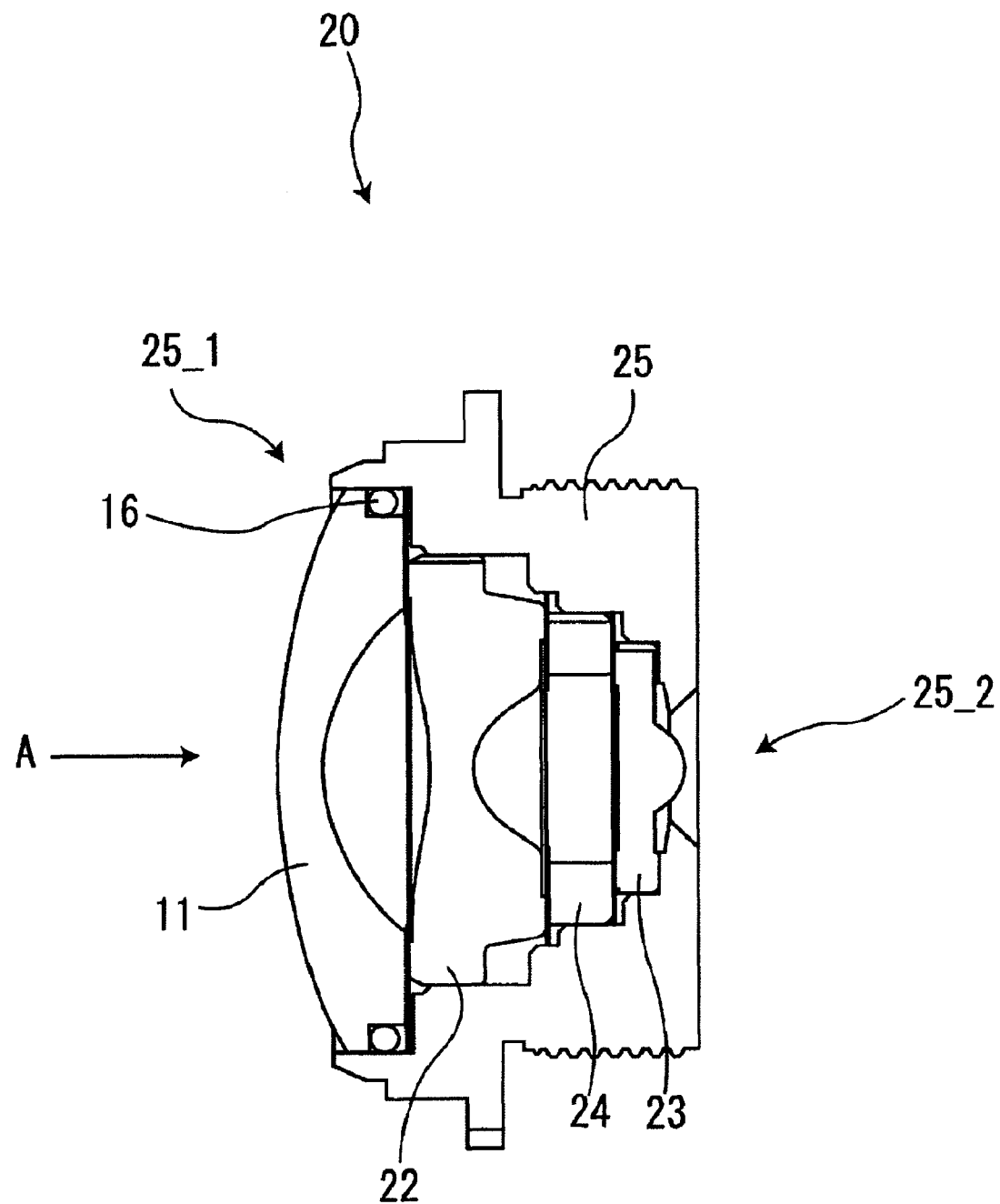

LENS ASSEMBLY AND IMAGING APPARATUS

CROSS-REFERENCE TO RELATED APPLICATIONS

This application is based upon and claims the benefit of priority from the Japanese Patent Application No. 2008-94047 filed on Mar. 31, 2008; the entire contents of which are incorporated herein by reference.

BACKGROUND OF THE INVENTION

1. Field of the Invention

The invention relates to a lens assembly having a plurality of optical members and a barrel into which the plurality of optical members are mounted, and to an imaging apparatus having the lens assembly.

2. Description of the Related Art

A lens assembly having a plurality of optical members and a barrel into which the plurality of optical members are mounted has been known.

FIG. 12 is a view illustrating a section of a related-art lens assembly, in which the section includes an optical axis of a taking lens. FIG. 13 is an enlarged sectional view illustrating a part of the lens assembly shown in FIG. 12, in which the taking lens, a spacer ring, and the barrel are in close contact with each other.

FIG. 12 shows the lens assembly 100 including a taking lens 101 of a first group, a taking lens 102 of a second group, and a taking lens 103 of a third group in order from the incident side of subject light A. Between the taking lens 102 of the second group and the taking lens 103 of the third group, a spacer ring 104 configured to regulate a space between these taking lenses 102 and 103 of the second and third groups is disposed. Furthermore, FIG. 11 shows a barrel 105 into which the taking lenses 101, 102, and 103 of the first to third groups and the spacer ring 104 are mounted, and an O-ring 106 that is disposed between the taking lens 101 of the first group and the barrel 105.

Specifically, as shown in FIG. 13, the taking lens 101 of the first group has an outer peripheral surface 101a, and the barrel 105 has an inner surface 105a. The O-ring 106 is fitted onto the outer peripheral surface 101a, and is disposed in a state where the O-ring is pressed by the outer peripheral surface 101a and the inner surface 105a. The O-ring 106 is a member made of rubber that exhibits waterproof performance after the taking lens 101 of the first group is mounted into the barrel 105.

Furthermore, the taking lens 102 of the second group has an outer peripheral surface 102a, and the barrel 105 has an inner surface 105b. The taking lens 102 of the second group is mounted in a state where the outer peripheral surface 102a of the taking lens 102 of the second group is in close contact with the inner surface 105b of the barrel 105. Further, the spacer ring 104 has an outer peripheral surface 104a, and the barrel 105 has an inner surface 105c. The spacer ring 104 is mounted in a state where the outer peripheral surface 104a of the spacer ring 104 is in close contact with the inner surface 105c of the barrel 105. Moreover, the taking lens 103 of the third group has an outer peripheral surface 103a, and the barrel 105 has an inner surface 105d. The taking lens 103 of the third group is mounted in a state where the outer peripheral surface 103a of the taking lens 103 of the third group is in close contact with the inner surface 105d of the barrel 105. In addition, the taking lens 103 of the third group is mounted in a state where an annular area 103b that is a periphery of the image-side surface of the taking lens 103 of the third group is also in close contact with a surface 105e of the barrel 105.

When the lens assembly 100 is assembled, first, the taking lens 103 of the third group is mounted into the barrel 105. Then, the spacer ring 104 is mounted into the barrel 105, and additionally the taking lens 102 of the second group is mounted into the barrel 105. Then, the O-ring 106 is fitted onto the outer peripheral surface 101a of the taking lens 101 of the first group, and finally the taking lens 101 of the first group is mounted into the barrel 105. In such a manner, the lens assembly 100 configured to secure close contact between the outer peripheral surface 101a of the taking lens 101 of the first group and the O-ring 106 and close contact between the inner surface 105a of the barrel 105 and the O-ring 106 is assembled.

JP 2002-90603 A (corresponding to U.S. Pat. No. 6,507,700) has proposed a technique that caulks a protrusion of a leading end of a barrel on a front surface side of a taking lens in the way of thermal adhesion in a state where an O-ring disposed between an outer peripheral surface of the taking lens and an inner surface of the barrel is pressed.

As described above, when the lens assembly is assembled, first, the taking lens of the third group is mounted into the barrel. Next, the spacer ring is mounted into the barrel, and additionally the taking lens of the second group is mounted into the barrel. Finally, the taking lens of the first group having the O-ring fitted thereto is mounted into the barrel. Here, in a state where the taking lens of the third group, the spacer ring, and the taking lens of the second group are sequentially mounted into the barrel, the taking lens of the first group having the O-ring fitted thereto is mounted into the barrel. In this case, outer peripheral surfaces of the taking lens of the third group, the spacer ring, and the taking lens of the second group, which have already mounted into the barrel, are in close contact with the respective inner surfaces of the barrel. Thus, air in the barrel is pressed by the taking lens of the first group, and thereby the air is compressed. Then, the pressed air pushes back on the taking lens of the first group in an opposite direction (a direction toward the object side of the barrel) to a direction in which the taking lens is mounted. Hence, in the related-art lens assembly, there is a problem in that assembling workability is poor.

SUMMARY OF THE INVENTION

In view of the above, the invention provides a lens assembly and an imaging apparatus excellent in assembling workability.

According to an aspect of the invention, a lens assembly includes a plurality of optical members, and a barrel. The barrel is formed in a hollow shape and has an object-side opening and an image-side opening. The plurality of optical members are mounted into the barrel in order according to a rule that if one optical member is to be disposed closer to an object side than another optical member, the one optical member is mounted later than that said another optical member. Before an most-object-side optical member among the plurality of optical members is mounted in the barrel, a ventilation channel passing from the object-side opening to the image-side opening is provided to pass between optical members other than the most-object-side optical member and an inner surface of the barrel.

In related art, in an assembling of a lens assembly, for example, after the taking lens of the third group, the spacer ring, and the taking lens of the second group are sequentially mounted into the barrel, the taking lens of the first group having the O-ring fitted thereto is mounted into the barrel. In this case, the outer peripheral surfaces of the taking lens of the third group, the spacer ring, and the taking lens of the second group, which have already been mounted in the barrel, are in close contact with each inner surface of the barrel. Thus, air in the barrel is pressed by the taking lens of the first group, and thereby the air is compressed. Then, the pressed air pushes back on the taking lens of the first group in an opposite direction to a direction in which the taking lens is mounted. Accordingly, there is a problem in that assembling workability is poor.

In the lens assembly according to the one aspect of the invention, before an most-object-side optical member among the plurality of optical members is mounted, ventilation channels passing between the object-side opening and the image-side opening are provided between optical members other than the most-object-side optical member among the plurality of optical members and the inner surfaces of the barrel, respectively. Hence, when the most-object-side optical member (for example, the taking lens of the first group) is mounted into the barrel, air in the barrel is pushed out from the image-side opening of the barrel through the ventilation channel. Accordingly, air in the barrel is pushed out from the image-side opening without being compressed, and is not pushed back in an opposite direction (a direction toward the object side of the barrel) to a direction in which the object side optical member is mounted. Therefore, it is possible to easily mount the object side optical member into the barrel. As a result, it is possible to provide the lens assembly excellent in assembling workability.

Also, it is preferable that an O-ring be provided between an outer peripheral surface of the most-object-side optical member and the inner surface of the barrel.

In such a manner, close contact between the outer peripheral surface of the object side optical member and the O-ring and close contact between the inner surface of the barrel and the O-ring are secured. As a result, it is possible to improve waterproof performance.

Also, the following configuration is preferable. That is, the image-side opening has a diameter smaller than an outer diameter of a most-image-side optical member among the plurality of optical members. The barrel has a wall surface, inside the image-side opening, configured to be in contact with an annular area that is a periphery of an image-side surface of the most-image-side optical member. A ventilation hole that communicate with each other only when the most-image-side optical member is located at a specific rotation position are formed by the wall surface and the annular area of the most-image-side optical member. The most-image-side optical member has a rotating hole into which a leading end of a jig configured to be inserted from the image-side opening to rotate the most-image-side optical member is inserted.

In such a manner, in the assembling of the lens assembly, when the most-object-side optical member is mounted into the barrel, it is possible to push out the air in the barrel through the ventilation hole. Thus, it is possible to easily mount the most-object-side optical member into the barrel. Subsequently, by rotating the image side optical member, it is possible to block the ventilation hole. As a result, it is possible to prevent dust from entering the assembled lens assembly.

According to another aspect of the invention, an imaging apparatus includes the lens assembly described above, and an imaging device.

In the above imaging apparatus according, the lens assembly is provided. As a result, assembling workability thereof is excellent.

According to the above configurations, it is possible to provide a lens assembly and an imaging apparatus excellent in assembling workability.

BRIEF DESCRIPTION OF THE DRAWINGS

FIG. 3 is a view illustrating a section of a lens assembly according to a second embodiment of the invention, in which the section includes an optical axis of a taking lens.

DETAILED DESCRIPTION OF EMBODIMENTS OF THE INVENTION

Hereinafter, embodiments of the invention will be described with reference to the accompanying drawings.

Figure 1:
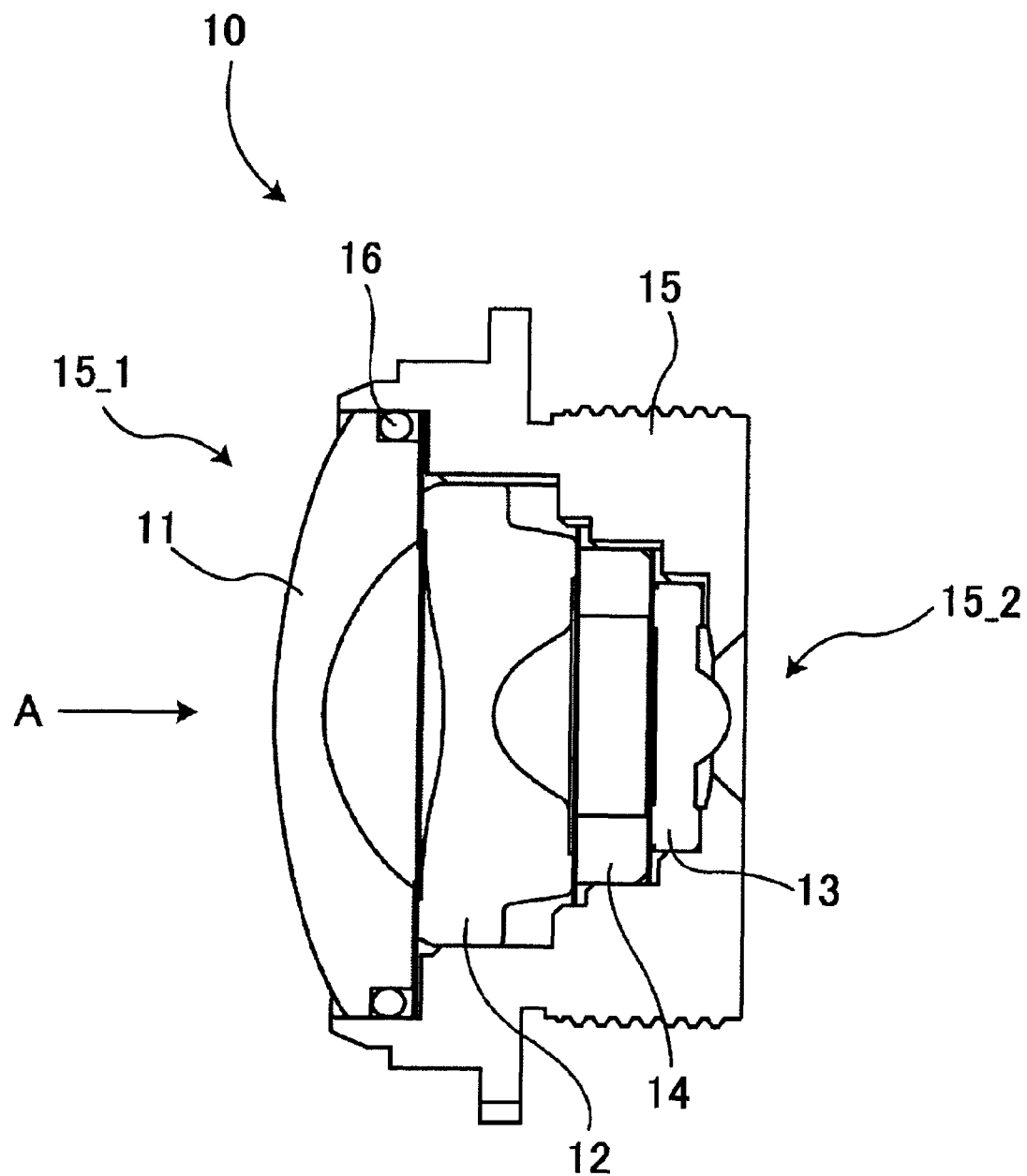
FIG. 1 is a view illustrating a section of a lens assembly according to a first embodiment of the invention, in which the section includes an optical axis of a taking lens.

FIG. 1 is a view illustrating a section of a lens assembly according to a first embodiment of the invention, in which the section includes an optical axis of a taking lens. FIG. 2 is an enlarged sectional view illustrating a part of the lens assembly shown in FIG. 1, in which the taking lens, a spacer ring and a barrel are in close contact with each other.

A lens assembly 10 according to the first embodiment shown in FIG. 1 includes a taking lens 11 of a first group, a taking lens 12 of a second group, and a taking lens 13 of a third group in order from the incident side of subject light A. Between the taking lens 12 of the second group and the taking lens 13 of the third group, a spacer ring 14 configured to regulate a space between these taking lenses 12 and 13 of the second and third groups is disposed. The taking lenses 11, 12, and 13 of the first, second and third groups and the spacer ring 14 correspond to an example of the plurality of optical members of the invention.

Furthermore, the lens assembly 10 includes a barrel 15 in which the taking lenses 11, 12, and 13 of the first, second, and third groups and spacer ring 14 are mounted. The barrel 15 has a hollow shape and has an object-side opening 15_1 and an image-side opening 15_2.

Further, the lens assembly 10 includes an O-ring 16 disposed between the taking lens 11 of the first group and the barrel 15.

Figure 2A:
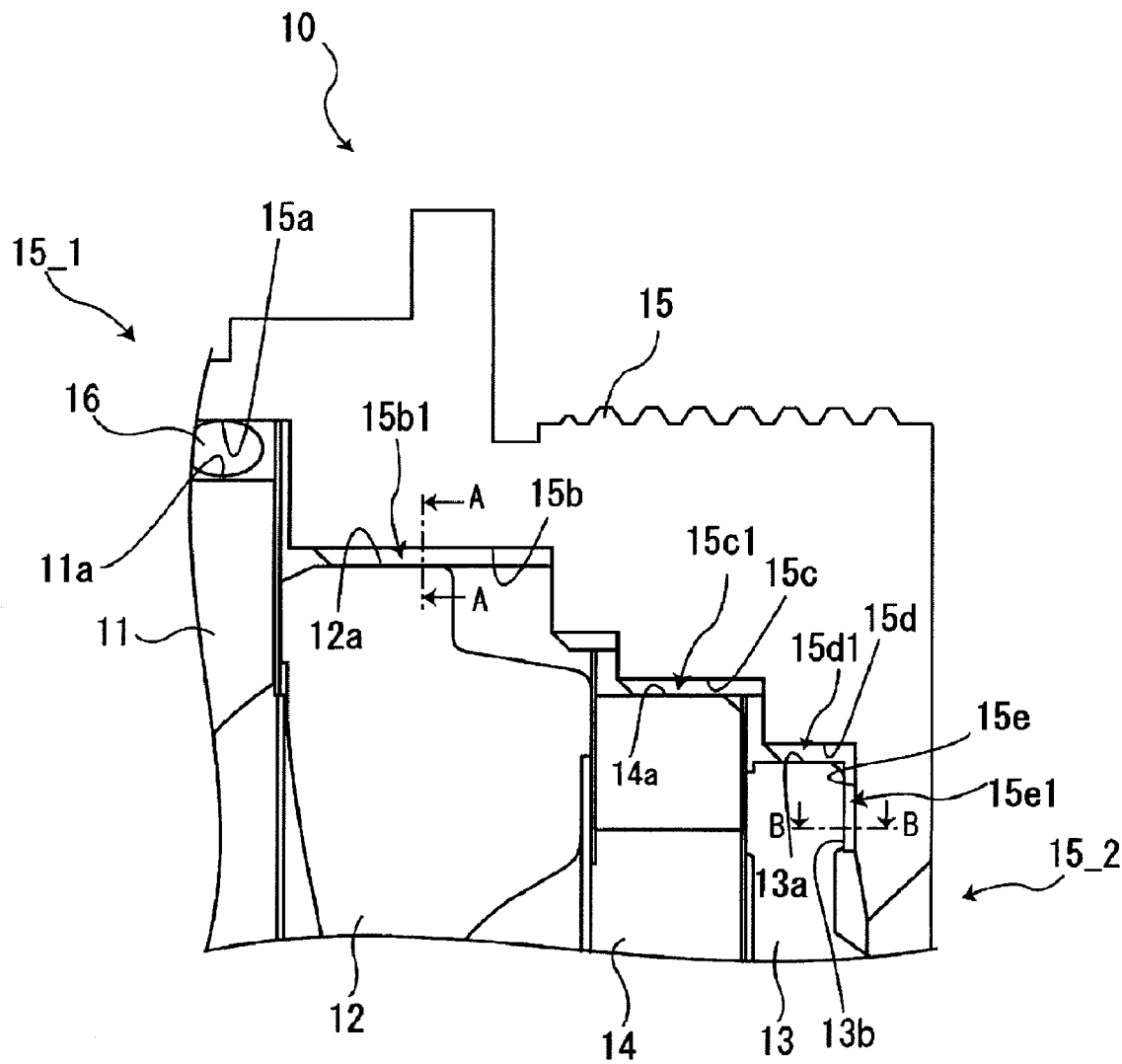
FIG. 2A is an enlarged sectional view illustrating a part of the lens assembly shown in FIG. 1, in which the taking lens, a spacer ring and a barrel are in close contact with each other.

Specifically, as shown in FIG. 2A, the taking lens 11 of the first group has an outer peripheral surface 11a, and the barrel 15 has an inner surface 15a. The O-ring 16 is fitted onto the outer peripheral surface 11a, and is disposed in a state where the O-ring 16 is pressed by the outer peripheral surface 11a and the inner surface 15a. The O-ring 16 is a member made of rubber that exhibits waterproof performance after the taking lens 11 of the first group is mounted into the barrel 15.

Figure 2B:
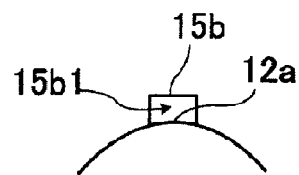
FIG. 2B is a section view taken along the AA line in FIG. 2A.

Furthermore, the taking lens 12 of the second group has an outer peripheral surface 12a, and the barrel 15 has an inner surface 15b. Here, as shown in FIG. 2B that is a section view taken along the AA line in FIG. 2A, a ventilation channel 15b1 for allowing air to pass between the object-side opening 15_1 and the image-side opening 15_2 is provided between the outer peripheral surface 12a of the taking lens 12 of the second group and the inner surface 15b of the barrel 15. The ventilation channel 15b1 is formed by processing (cutting) the inner surface 15b side of the barrel 15.

Furthermore, the spacer ring 14 has an outer peripheral surface 14a, and the barrel 15 has an inner surface 15c. Here, a ventilation channel 15c1 for allowing air to pass between the object-side opening 15_1 and the image-side opening 15_2 is provided between the outer peripheral surface 14a of the spacer ring 14 and the inner surface 15c of the barrel 15. The ventilation channel 15c1 is formed by processing the inner surface 15c side of the barrel 15.

Furthermore, the taking lens 13 of the third group has an outer peripheral surface 13a, and the barrel 15 has an inner surface 15d. Here, a ventilation channel 15d1 for allowing air to pass between the object-side opening 15_1 and the image-side opening 15_2 is provided between the outer peripheral surface 13a of the taking lens 13 of the third group and the inner surface 15d of the barrel 15. The ventilation channel 15d1 is formed by processing the inner surface 15d side of the barrel 15.

Figure 2C:
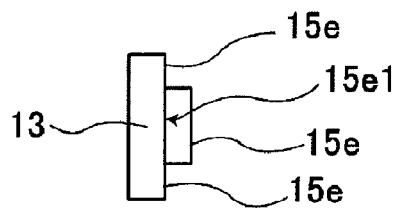
FIG. 2C is a section view taken along the BB line in FIG. 2A

Furthermore, the image-side opening 15_2 included in the barrel 15 has a diameter smaller than an outer diameter of the taking lens 13 of the third group. The barrel 15 has, inside the image-side opening 15_2, a surface 15e coming into contact with an annular area 13b that is a periphery of an image-side surface of the taking lens 13 of the third group. Here, as shown in FIG. 2C that is a section view taken along the BB line in FIG. 2A, a ventilation channel 15e1 for allowing air to pass between the object-side opening 15_1 and the image-side opening 15_2 is provided between the annular area 13b of the taking lens 13 of the third group and the surface 15e of the barrel 15. The ventilation channel 15e1 is formed by processing the surface 15e side of the barrel 15.

When the lens assembly 10 is assembled, first, the taking lens 13 of the third group is mounted into the barrel 15. Next, the spacer ring 14 and the taking lens 12 of the second group are sequentially mounted into the barrel 15. In addition, the O-ring 16, which exhibits waterproof performance, is fitted onto the outer peripheral surface 11a of the taking lens 11 of the first group, and then the taking lens 11 of the first group having the O-ring 16 fitted thereto is mounted into the barrel 15. After the taking lens 11 of the first group is housed in the barrel 15, the anterior end of the barrel 15 is deformed by thermal caulking, thereby holding the taking lens 11 of the first group.

Here, as described above, the ventilation channel 15b1 is provided between the outer peripheral surface 12a of the taking lens 12 of the second group and the inner surface 15b of the barrel 15. Furthermore, the ventilation channel 15c1 is provided between the outer peripheral surface 14a of the spacer ring 14 and the inner surface 15c of the barrel 15. Further, the ventilation channel 15d1 is provided between the outer peripheral surface 13a of the taking lens 13 of the third group and the inner surface 15d of the barrel 15. In addition, the ventilation channel 15e1 is provided between the annular area 13b of the taking lens 13 of the third group and the surface 15e of the barrel 15.

As described above, in the lens assembly 10 according to the first embodiment, the ventilation channels 15b1, 15c1, 15d1, and 15e1 penetrating between the object-side opening 15_1 and the image-side opening 15_2 of the barrel 15 are formed by processing the inner surfaces 15b, 15c, and 15d and the wall surface 15e of the barrel 15. Hence, when the taking lens 11 of the first group is mounted into the barrel 15, air in the barrel 15 is pushed out from the image-side opening 15_2 of the barrel 15 through the ventilation channels 15b1, 15c1, 15d1, and 15e1. Accordingly, as compared with the related-art lens assembly being in a state where the outer peripheral surfaces of the taking lens of the third group, the spacer ring, and the taking lens of the second group are in close contact with the inner surfaces of the barrel, air in the barrel is pushed out from the image-side opening without being compressed, and is not pushed back in an opposite direction (a direction toward the object side of the barrel) to a direction in which the taking lens of the first group is mounted. Therefore, it is possible to easily mount the taking lens 11 of the first group into the barrel 15. As a result, it is possible to provide the lens assembly 10 excellent in assembling workability.

Figure 4A:
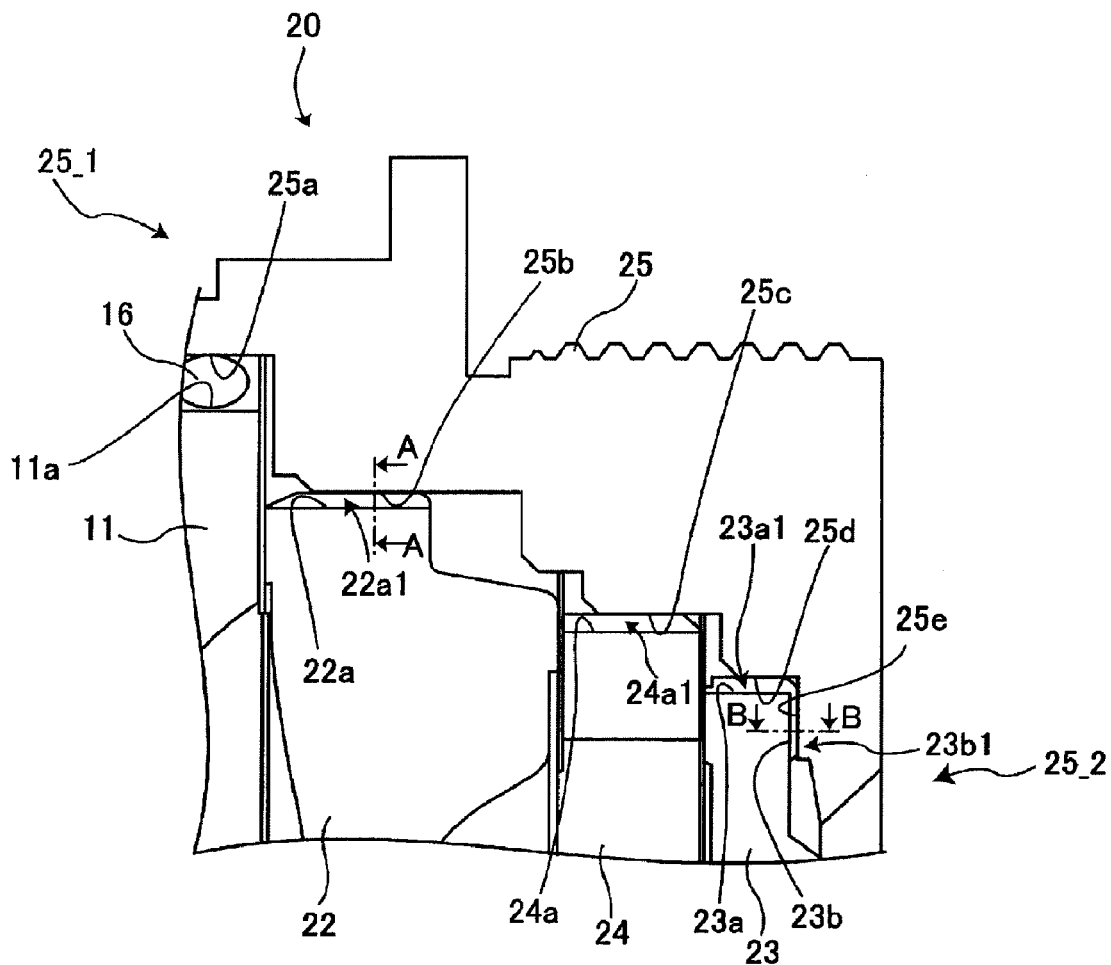
FIG. 4A is an enlarged sectional view illustrating a part of the lens assembly shown in FIG. 3, in which the taking lens, a spacer ring and a barrel are in close contact with each other.

FIG. 3 is a view illustrating a section of a lens assembly according to a second embodiment of the invention, in which the section includes an optical axis of a taking lens. FIG. 4 is an enlarged sectional view illustrating a part of the lens assembly shown in FIG. 3, in which the taking lens, a spacer ring, and a barrel are in close contact with each other.

Furthermore, in the following description, elements that are the same as those of the lens assembly 10 shown in FIGS. 1 and 2 will be referenced by the same reference numerals and signs.

A lens assembly 20 according to the second embodiment shown in FIG. 3 includes a taking lens 11 of a first group, a taking lens 22 of a second group, and a taking lens 23 of a third group in order from the incident side of subject light A. Between the taking lens 22 of the second group and the taking lens 23 of the third group, a spacer ring 24 configured to regulate a space between these taking lenses 22 and 23 of the second and third groups is disposed. The taking lenses 11, 22, and 23 of the first, second, and third groups and the spacer ring 24 correspond to another example of the plurality of optical members of the invention.

Furthermore, the lens assembly 20 includes a barrel 25 in which the taking lenses 11, 22, and 23 of the first, second, and third groups and spacer ring 24 are mounted. The barrel 25 has a hollow shape and has an object-side opening 25_1 and an image-side opening 25_2.

Further, the lens assembly 20 includes the O-ring 16 disposed between the taking lens 11 of the first group and the barrel 25.

Specifically, as shown in FIG. 4, the taking lens 11 of the first group has the outer peripheral surface 11a, and the barrel 25 has an inner surface 25a. The O-ring 16 is fitted onto the outer peripheral surface 11a, and is disposed in a state where the O-ring is pressed by the outer peripheral surface 11a and the inner surface 25a.

Figure 4B:
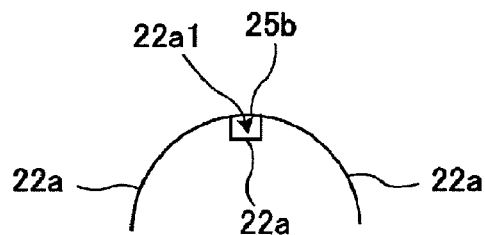
FIG. 4B is a section view taken along the AA line in FIG. 4A.

Furthermore, the taking lens 22 of the second group has an outer peripheral surface 22a, and the barrel 25 has an inner surface 25b. Here, as shown in FIG. 4B that is a section view taken along the AA line in FIG. 4A, a ventilation channel 22a1 for allowing air to pass between the object-side opening 25_1 and the image-side opening 25_2 is provided between the outer peripheral surface 22a of the taking lens 22 of the second group and the inner surface 25b of the barrel 25. The ventilation channel 22a1 is formed by processing the outer peripheral surface 22a of the taking lens 22 of the second group.

Furthermore, the spacer ring 24 has an outer peripheral surface 24a, and the barrel 25 has an inner surface 25c. Here, a ventilation channel 24a1 for allowing air to pass between the object-side opening 25_1 and the image-side opening 25_2 is provided between the outer peripheral surface 24a of the spacer ring 24 and the inner surface 25c of the barrel 25. The ventilation channel 24a1 is formed by processing the outer peripheral surface 24a of the spacer ring 24.

Furthermore, the taking lens 23 of the third group has an outer peripheral surface 23a, and the barrel 25 has an inner surface 25d. Here, a ventilation channel 23a1 for allowing air to pass between the object-side opening 25_1 and the image-side opening 25_2 is provided between the outer peripheral surface 23a of the taking lens 23 of the third group and the inner surface 25d of the barrel 25. The ventilation channel 23a1 is formed by processing the outer peripheral surface 23a of the taking lens 23 of the third group.

Figure 4C:
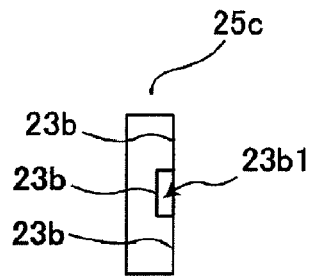
FIG. 4C is a section view taken along the BB line in FIG. 4A

Furthermore, the image-side opening 25_2 included in the barrel 25 has a diameter smaller than an outer diameter of the taking lens 23 of the third group. The barrel 25 has, inside the image-side opening 25_2, a surface 25e coming into contact with an annular area 23b that is a periphery of an image-side surface of the taking lens 23 of the third group. Here, as shown in FIG. 4C that is a section view taken along the BB line of FIG. 4A, a ventilation channel 23b1 for allowing air to pass between the object-side opening 25_1 and the image-side opening 25_2 is provided between the annular area 23b of the taking lens 23 of the third group and the surface 25e of the barrel 25. The ventilation channel 23b1 is formed by processing the annular area 23b of the taking lens 23 of the third group.

When the lens assembly 20 is assembled, first, the taking lens 23 of the third group is mounted into the barrel 25. Next, the spacer ring 24 and the taking lens 22 of the second group are sequentially mounted into the barrel 25. In addition, the O-ring 16, which exhibits waterproof performance, is fitted onto the outer peripheral surface 11a of the taking lens 11 of the first group, and then the taking lens 11 of the first group having the O-ring 16 fitted thereto is mounted into the barrel 25.

Here, as described above, the ventilation channel 22a1 is provided between the outer peripheral surface 22a of the taking lens 22 of the second group and the inner surface 25b of the barrel 25. Furthermore, the ventilation channel 24a1 is provided between the outer peripheral surface 24a of the spacer ring 24 and the inner surface 25c of the barrel 25. Further, the ventilation channel 25d is provided between the outer peripheral surface 23a of the taking lens 23 of the third group and the inner surface 25d of the barrel 25. In addition, the ventilation channel 23b1 is provided between the annular area 23b of the taking lens 23 of the third group and the surface 25e of the barrel 25.

As described above, in the lens assembly 20 according to the second embodiment, the ventilation channels 22a1, 24a1, 23a1, and 23b1 penetrating between the object-side opening 25_1 and the image-side opening 25_2 of the barrel 25 is formed by processing the outer peripheral surface 22a of the taking lens 22 of the second group, the outer peripheral surface 24a of the spacer ring 24, and the outer peripheral surface 23a and the annular area 23b of the taking lens 23 of the third group of the barrel 25. Hence, when the taking lens 11 of the first group is mounted into the barrel 25, air in the barrel 25 is pushed out from the image-side opening 25_2 of the barrel 25 through the ventilation channels 22a1, 24a1, 23a1, and 23b1. Accordingly, it is possible to easily mount the taking lens 11 of the first group into the barrel 25, and it is possible to improve assembling workability of the lens assembly 20.

Figure 5:
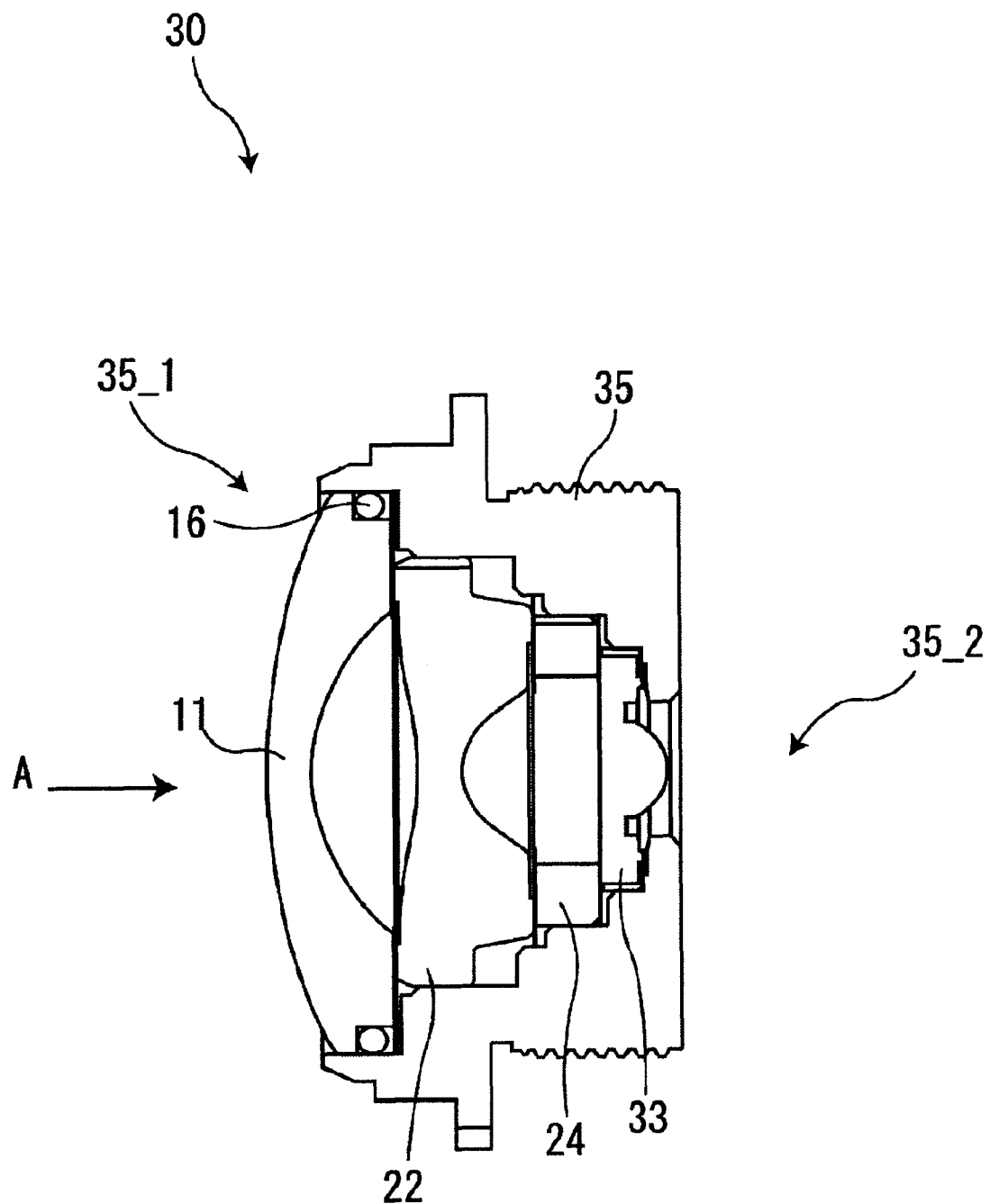
FIG. 5 is a view illustrating a section of a lens assembly according to a third embodiment of the invention, in which the section includes an optical axis of a taking lens.
Figure 6:
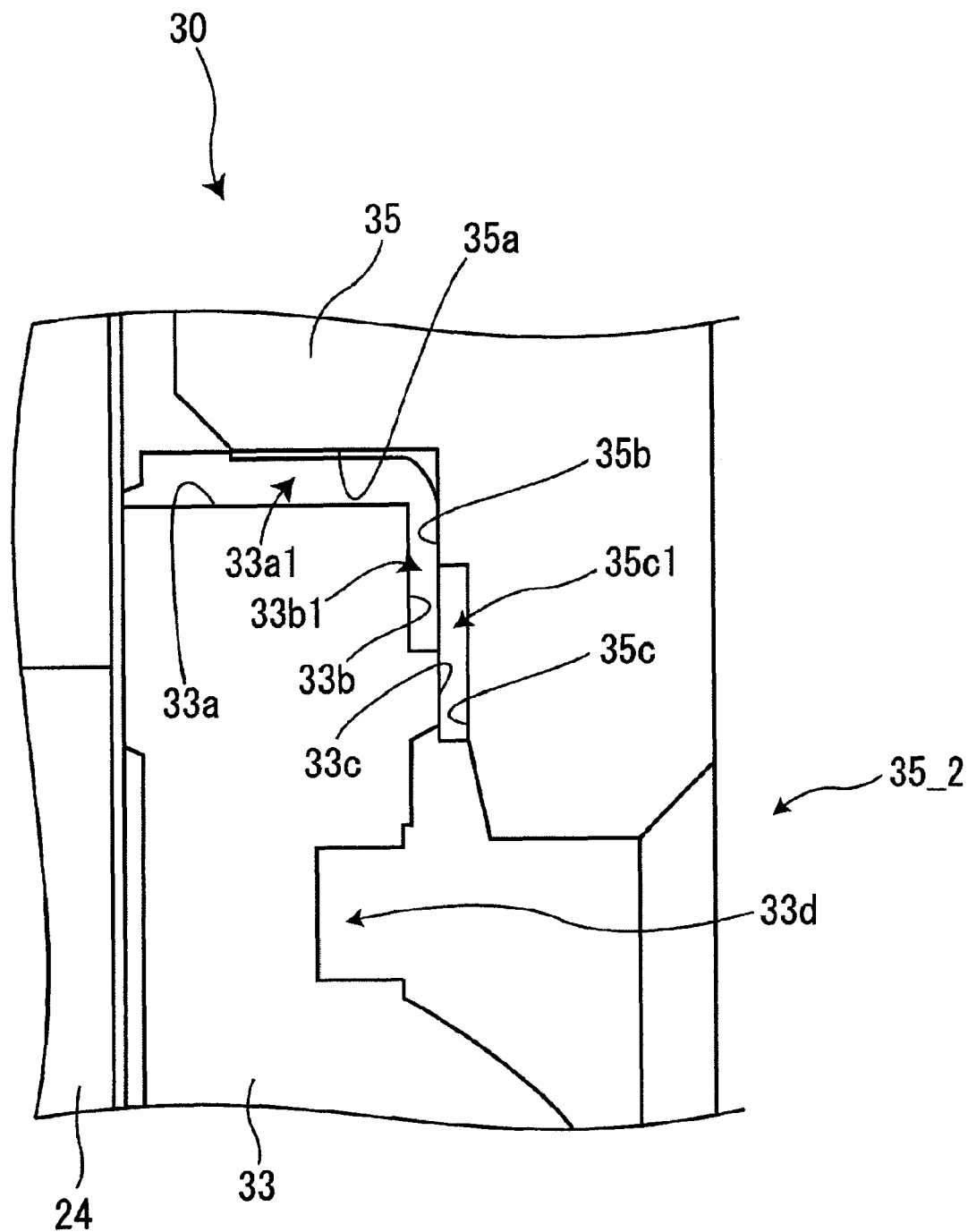
FIG. 6 is an enlarged sectional view illustrating a part of the lens assembly shown in FIG. 5, in which the taking lens of the third lens and a barrel are in close contact with each other.

FIG. 5 is a view illustrating a section of a lens assembly according to a third embodiment of the invention, in which the section includes an optical axis of a taking lens. FIG. 6 is an enlarged sectional view illustrating a part of the lens assembly shown in FIG. 5, in which the taking lens of the third group and a barrel are in close contact with each other.

Furthermore, in the following description, elements that are the same as those of the lens assembly 20 shown in FIGS. 3 and 4 will be referenced by the same reference numerals and signs.

In the lens assembly 30 shown in FIGS. 5 and 6, as compared with the lens assembly 20 shown in FIGS. 3 and 4, the taking lens 23 of the third group and the barrel 25 shown in FIGS. 3 and 4 are replaced by a taking lens 33 of the third group and a barrel 35 that are described below.

As shown in FIG. 6, the taking lens 33 of the third group has an outer peripheral surface 33a. In addition, the barrel 35 has an inner surface 35a. Furthermore, a ventilation channel 33a1 for allowing air to pass between the object-side opening 35_1 and the image-side opening 35_2 is provided between the outer peripheral surface 33a of the taking lens 33 of the third group and the inner surface 35a of the barrel 35. The ventilation channel 33a1 is formed by processing the outer peripheral surface 33a of the taking lens 33 of the third group.

Furthermore, the image-side opening 35_2 included in the barrel 35 has a diameter smaller than an outer diameter of the taking lens 33 of the third group. The barrel 35 has, inside the image-side opening 35_2, an upper surface 35b coming into contact with an upper annular area 33b that is a periphery of an image-side surface of the taking lens 33 of the third group. Between the upper annular area 33b and the upper surface 35b, a first ventilation hole 33b1 for allowing air to pass between the object-side opening 35_1 and the image-side opening 35_2 is provided. The first ventilation hole 33b1 is formed by processing the upper annular area 33b of the taking lens 33 of the third group, and communicates with the ventilation channel 33a1.

Furthermore, the barrel 35 has, inside the image-side opening 35_2, a lower surface 35c coming into contact with a lower annular area 33c that is a periphery of the image-side surface of the taking lens 33 of the third group. Between the lower annular area 33c and the lower surface 35c, a second ventilation hole 35c1 for allowing air to pass between the object-side opening 35_1 and the image-side opening 35_2 is provided. The second ventilation hole 35c1 is formed by processing the lower surface 35c of the barrel 35.

As described above, the first ventilation hole 33b1 and the second ventilation hole 35c1, which are ventilation channels for allowing air to pass between the object-side opening 35_1 and the image-side opening 35_2, are separately formed between the surfaces (the upper surface 35b and the lower surface 35c) of the barrel 35 and the annular areas (the upper annular area 33b and the lower annular area 33c) of the taking lens 33 of the third group. The first ventilation hole 33b1 and the second ventilation hole 35c1 are ventilation holes that communicate with each other only when the taking lens 33 of the third group is located at a specific rotation position.

When the lens assembly 30 is assembled, first, the taking lens 33 of the third group is mounted into the barrel 35. Next, the spacer ring 24 and the taking lens 22 of the second group are sequentially mounted into the barrel 35. In addition, the taking lens 11 of the first group having the O-ring 16 fitted thereto is mounted into the barrel 35. Here, the taking lens 33 of the third lens group is located at the specific rotation position. Hence, the first ventilation hole 33b1 communicates with the second ventilation hole 35c1. Thus, air in the barrel 35 is pushed out from the image-side opening 35_2 of the barrel 35 through the above-mentioned ventilation channels 22a1 and 24a1, the ventilation channel 33a1, and the ventilation holes 33b1 and 35c1. Accordingly, it is possible to easily mount the taking lens 11 of the first group into the barrel 35.

Furthermore, the taking lens 33 of the third group has a rotating hole 33d into which a leading end of a jig is inserted. The rotating hole 33d is used in such a manner that after the taking lens 11 of the first group is mounted into the barrel 35, the jig is inserted thereinto from the image-side opening 35_2 thereby rotating the taking lens 33 of the third group.

Figure 7:
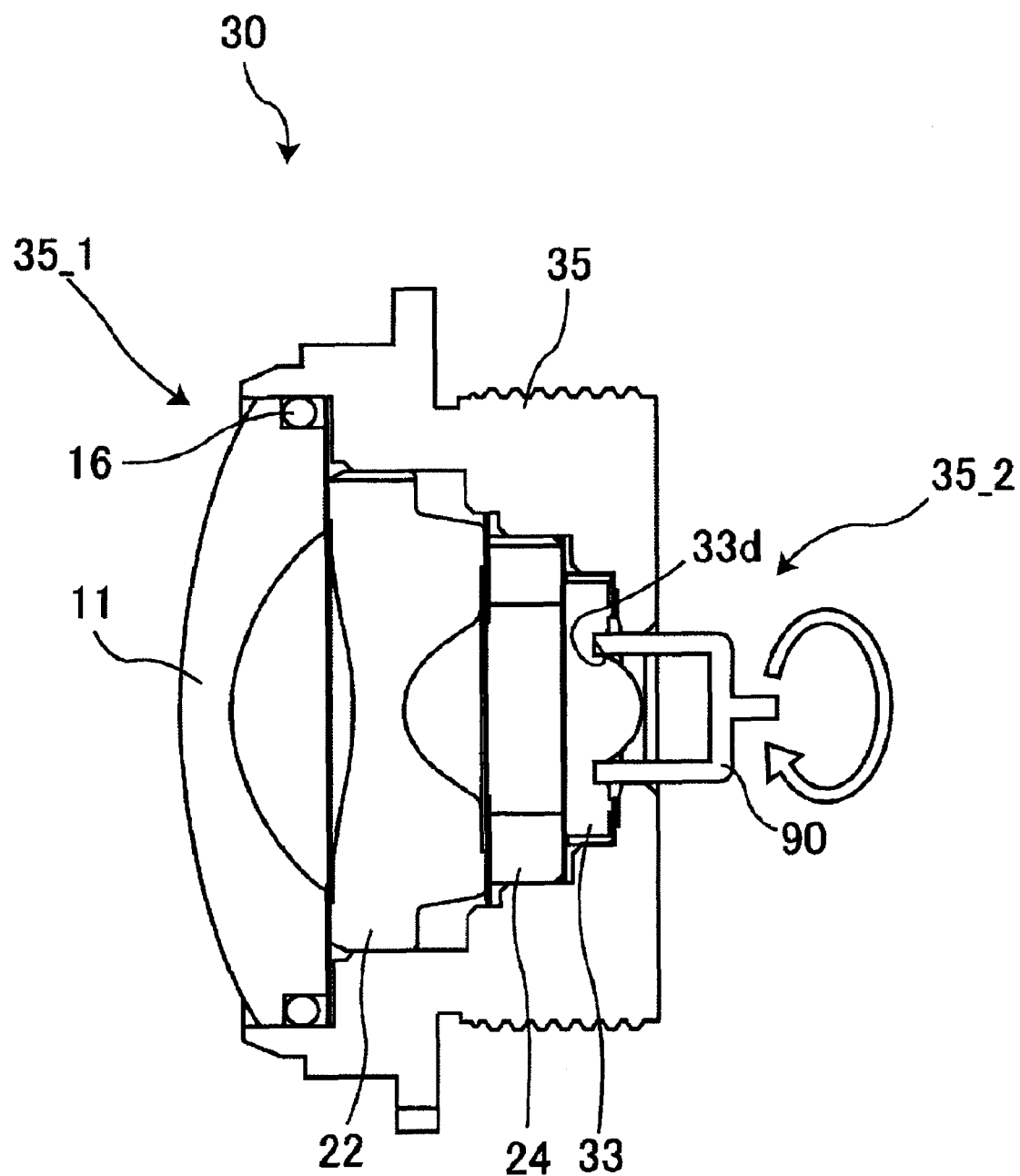
FIG. 7 is a view illustrating the lens assembly shown in FIGS. 5 and 6, in which a taking lens of a third group is rotated by inserting a leading end of a jig into a rotating hole provided on the taking lens of the third group.

FIG. 7 is a view illustrating the lens assembly shown in FIGS. 5 and 6, in which the taking lens of the third group is rotated by inserting the leading end of the jig into the rotating hole provided on the taking lens of the third group.

The leading end of the jig 90 is inserted into the rotating hole 33d of the taking lens 33 of the third group constituting the lens assembly 30 shown in FIG. 7, and the jig 90 is rotated from the specific rotation position to a predetermined rotation position. Then, the first ventilation hole 33b1 and the second ventilation hole 35c1 shown in FIG. 6 does not communicate with each other, and thus the ventilation hole formed by the first ventilation hole 33b1 and the second ventilation hole 35c1 is blocked. In this manner, it is possible to prevent dust from entering the lens assembly 30.

Figure 8:
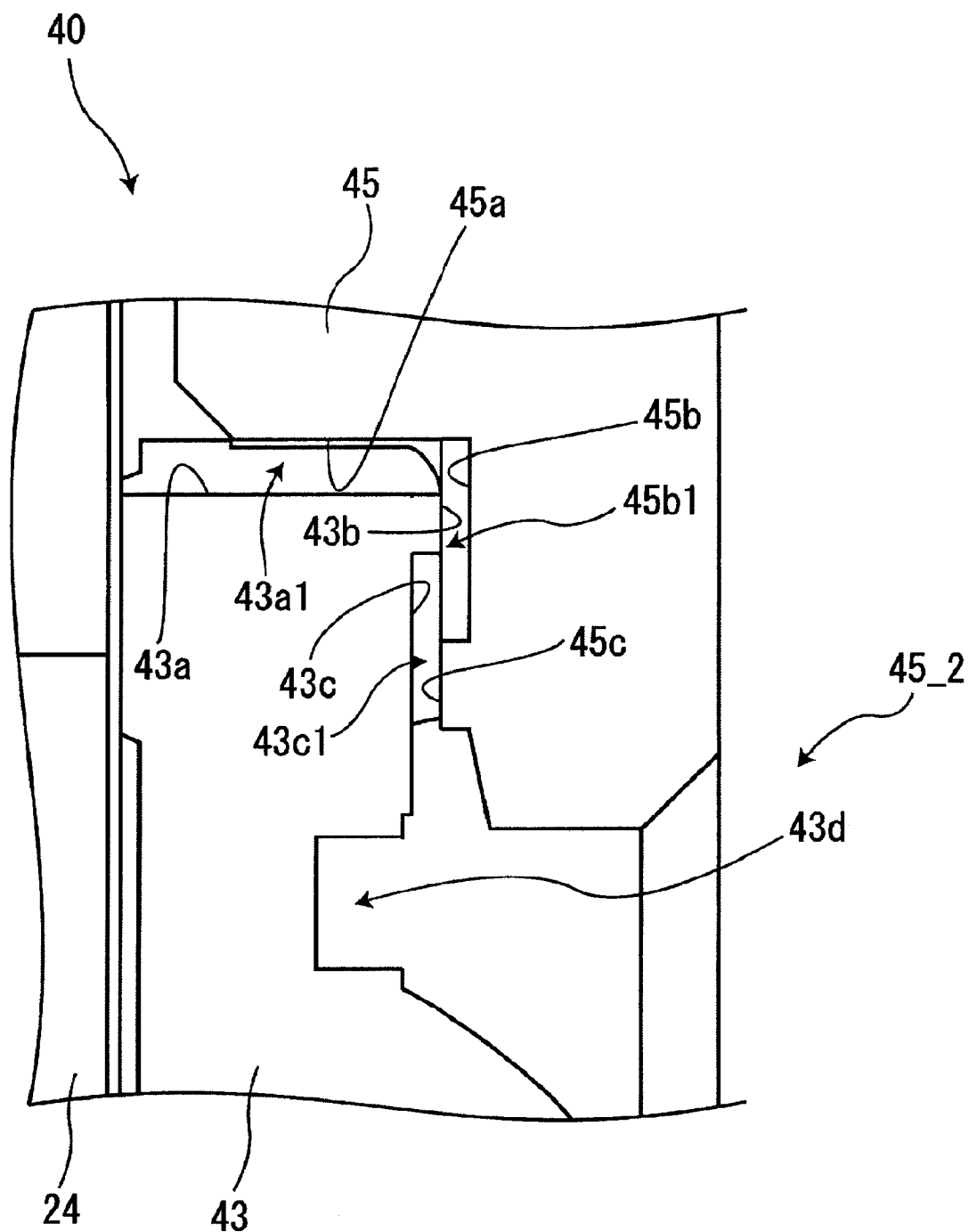
FIG. 8 is an enlarged sectional view illustrating a part of the lens assembly according to a fourth embodiment of the invention, in which the taking lens of the third group and the barrel are in close contact with each other.

FIG. 8 is an enlarged sectional view illustrating a part of the lens assembly according to a fourth embodiment of the invention, in which the taking lens of the third group and the barrel are in close contact with each other.

Furthermore, a view illustrating a section including an optical axis of the taking lens of the lens assembly 40 shown in FIG. 8 is the same as that illustrating the section including the optical axis of the taking lens of the lens assembly 30 shown in FIG. 5, and thus the view is omitted.

The taking lens 43 of the third group constituting the lens assembly 40 shown in FIG. 8 has an outer peripheral surface 43a, and the barrel 45 has the inner surface 45a. Between the outer peripheral surface 43a and the inner surface 45a, a ventilation channel 43a1 for allowing air to pass therethrough is provided. The ventilation channel 43a1 is formed by processing the outer peripheral surface 43a of the taking lens 43 of the third group.

Furthermore, the barrel 45 has, inside the image-side opening 45_2, an upper surface 45b coming into contact with an upper annular area 43b that is a periphery of an image-side surface of the taking lens 43 of the third group. Between the upper annular area 43b and the upper surface 45b, a first ventilation hole 45b1 for allowing air to pass therethrough is provided. The first ventilation hole 45b1 is formed by processing the upper surface 45b of the barrel 45.

Furthermore, the barrel 45 has, inside the image-side opening 45_2, a lower surface 45c coming into contact with a lower annular area 43c that is a periphery of the image-side surface of the taking lens 43 of the third group. Between the lower annular area 43c and the lower surface 45c, a second ventilation hole 43c1 for allowing air to pass therethrough is provided. The second ventilation hole 43c1 is formed by processing the lower annular area 43c of the taking lens 43 of the third group. Furthermore, the taking lens 43 of the third lens has a rotating hole 43d having the same function as the rotating hole 33d shown in FIG. 6. Hence, it is possible to prevent dust from entering the lens assembly 40.

In the above-mentioned lens assembly 30 according to the third embodiment, of the ventilation holes, which communicate with each other only when the taking lens 33 of the third group is at the specific rotation position, the first ventilation hole 33b1 is formed on the upper annular area 33b of the taking lens 33 of the third group, and the second ventilation hole 35c1 is formed on the lower surface 35c of the barrel 35. In contrast, in the lens assembly 40 according to the fourth embodiment, of the ventilation holes, which communicate with each other only when the taking lens 43 of the third group is at the specific rotation position, the first ventilation hole 45b1 may be formed on the upper surface 45b of the barrel 45, and the second ventilation hole 43c1 may be formed on the lower annular area 43c of the taking lens 43 of the third group.

Figure 9:
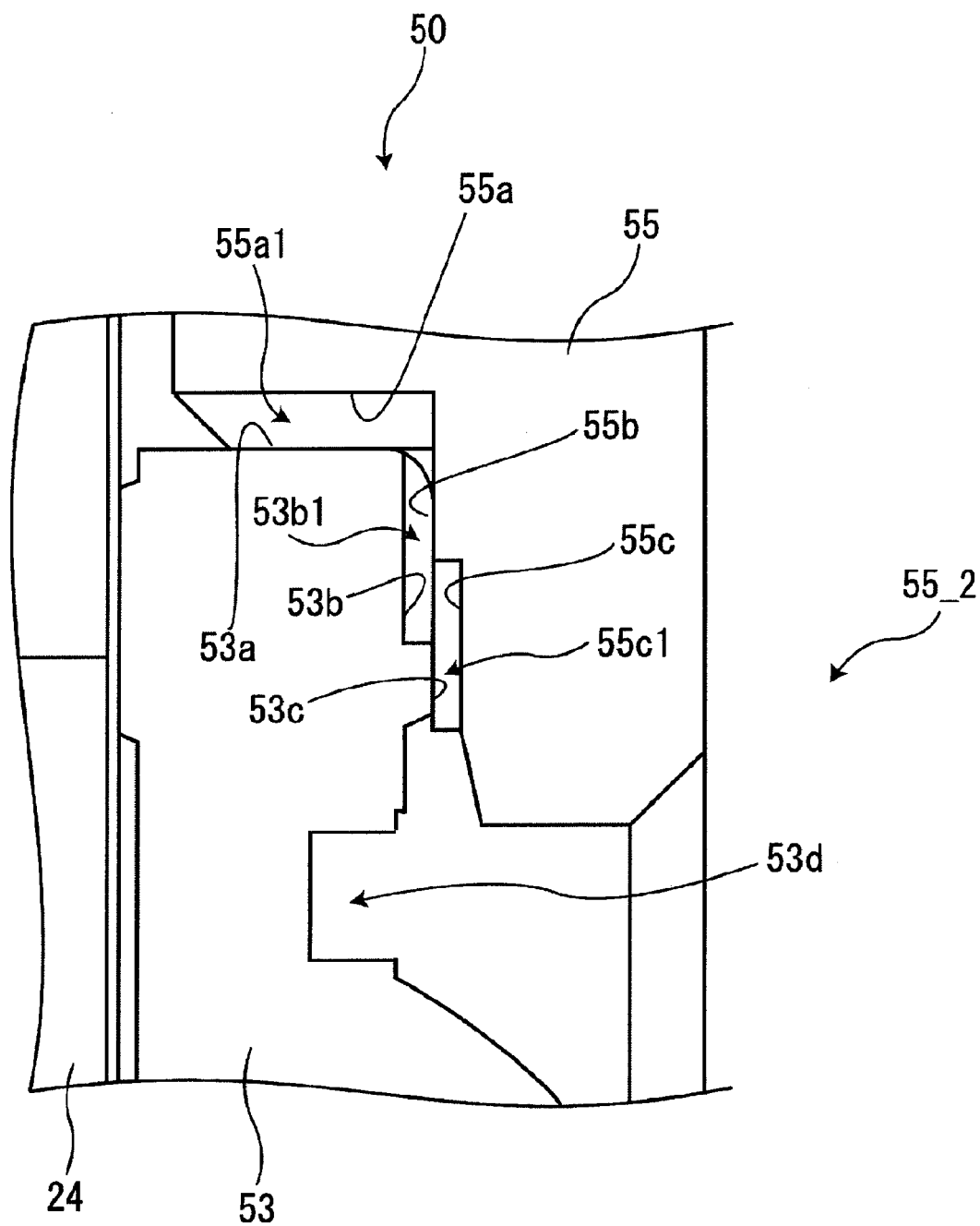
FIG. 9 is an enlarged sectional view illustrating a part of the lens assembly according to a fifth embodiment of the invention, in which the taking lens of the third group and the barrel are in close contact with each other.

FIG. 9 is an enlarged sectional view illustrating a part of the lens assembly according to a fifth embodiment of the invention, in which the taking lens of the third group and the barrel are in close contact with each other.

The taking lens 53 of the third group constituting the lens assembly 50 shown in FIG. 9 has an outer peripheral surface 53a, and the barrel 55 has the inner surface 55a. Between the outer peripheral surface 53a and the inner surface 55a, a ventilation channel 55a1 for allowing air to pass therethrough is provided. The ventilation channel 55a1 is formed by processing the inner surface 55a of the barrel 55.

Furthermore, the barrel 55 has, inside the image-side opening 55_2, an upper surface 55b coming into contact with an upper annular area 53b that is a periphery of an image-side surface of the taking lens 53 of the third group. Between the upper annular area 53b and the upper surface 55b, a first ventilation hole 53b1 for allowing air to pass therethrough is provided. The first ventilation hole 53b1 is formed by processing the upper annular area 53b of the taking lens 53 of the third group.

Furthermore, the barrel 55 has, inside the image-side opening 55_2, a lower surface 55c coming into contact with a lower annular area 53c that is a periphery of the image-side surface of the taking lens 53 of the third group. Between the lower annular area 53c and the lower surface 55c, a second ventilation hole 55c1 for allowing air to pass therethrough is provided. The second ventilation hole 55c1 is formed by processing the lower surface 55c of the barrel 55. Furthermore, the taking lens 53 of the third lens has a rotating hole 53d having the same function as the rotating hole 33d shown in FIG. 6.

In the lens assembly 50 according to the fifth embodiment, air in the barrel 55 is pushed out from the image-side opening 55_2 of the barrel 55 through the ventilation channel 55a, the first ventilation hole 53b1, and the second ventilation hole 55c1. Accordingly, it is possible to easily mount the taking lens of the first group into the barrel 55. As described above, between the outer peripheral surface 53a of the taking lens 53 of the third group and the inner surface 55a of the barrel 55, the ventilation channel 55a1 is formed by processing the inner surface 55a of the barrel 55. In addition, of the ventilation holes, which communicate each other only when the taking lens 53 of the third group is at the specific position, the first ventilation hole 53b1 is formed by processing the upper annular area 53b of the taking lens 33 of the third group. Further, the second ventilation hole 55c1 is formed by processing the lower surface 55c of the barrel 55. Thereby, it is possible to improve assembling workability of the lens assembly 50.

Figure 10:
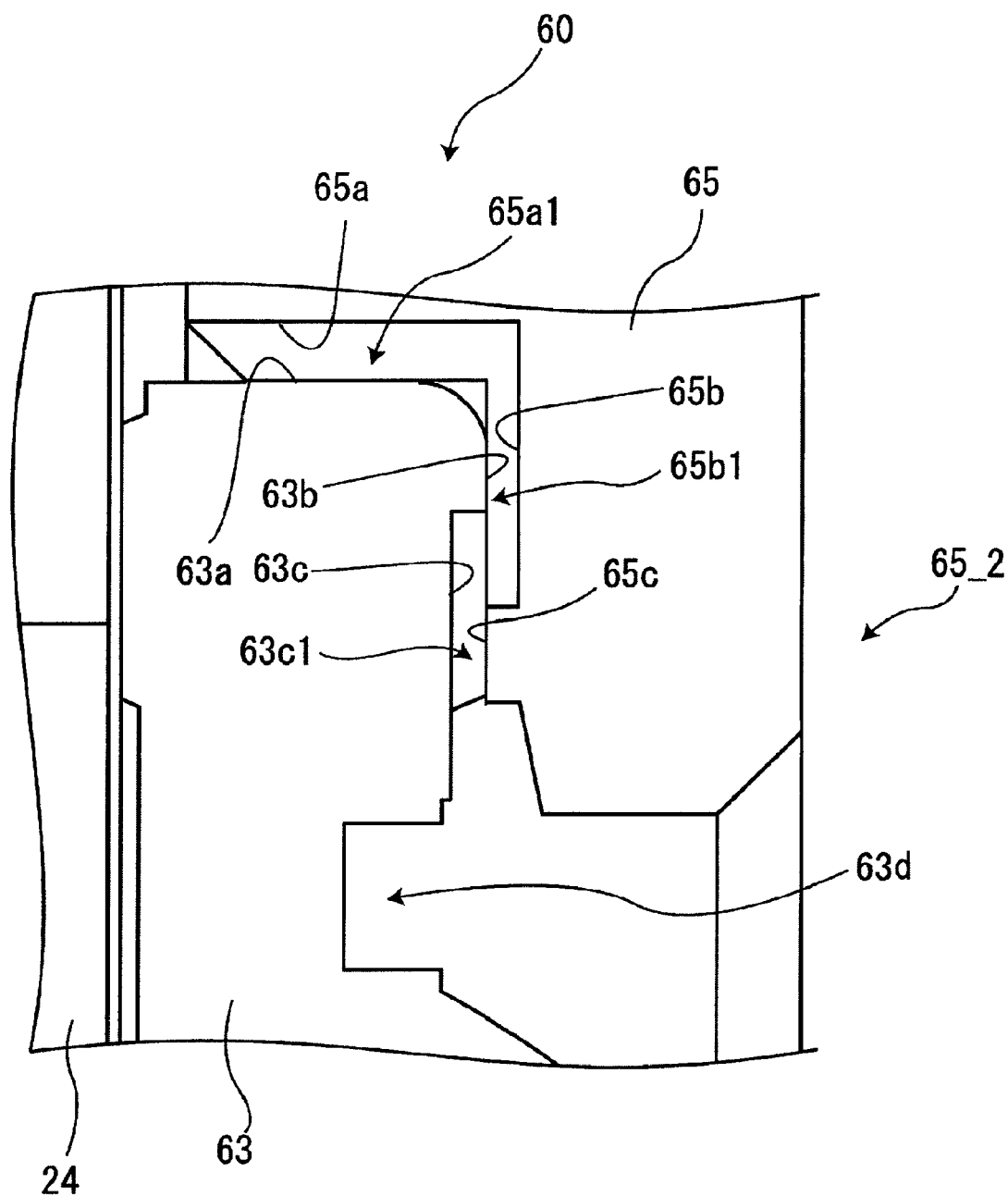
FIG. 10 is an enlarged sectional view illustrating a part of the lens assembly according to a sixth embodiment of the invention, in which the taking lens of the third group and the barrel are in close contact with each other.

FIG. 10 is an enlarged sectional view illustrating a part of the lens assembly according to a sixth embodiment of the invention, in which the taking lens of the third group and the barrel are in close contact with each other.

The taking lens 63 of the third group constituting the lens assembly 60 shown in FIG. 10 has an outer peripheral surface 63a, and the barrel 65 has the inner surface 65a. Between the outer peripheral surface 63a and the inner surface 65a, a ventilation channel 65a1 for allowing air to pass therethrough is provided. The ventilation channel 65a1 is formed by processing the inner surface 65a of the barrel 65.

Furthermore, the barrel 65 has, inside the image-side opening 65_2, an upper surface 65b coming into contact with an upper annular area 63b that is a periphery of an image-side surface of the taking lens 63 of the third group. Between the upper annular area 63b and the upper surface 65b, a first ventilation hole 65b1 for allowing air to pass therethrough is provided. The first ventilation hole 65b1 is formed by processing the upper surface 65b of the barrel 65, and communicates with the ventilation channel 65a1.

Furthermore, the barrel 65 has, inside the image-side opening 65_2, a lower surface 65c coming into contact with a lower annular area 63c that is a periphery of the image-side surface of the taking lens 63 of the third group. Between the lower annular area 63c and the lower surface 65c, a second ventilation hole 63c1 for allowing air to pass therethrough is provided. The second ventilation hole 63c1 is formed by processing the lower annular area 63c of the taking lens 63 of the third group. Furthermore, the taking lens 63 of the third lens has a rotating hole 63d having the same function as the rotating hole 33d shown in FIG. 6.

In the above-mentioned lens assembly 50 according to the fifth embodiment, of the ventilation holes, which communicate with each other only when the taking lens 53 of the third group is at the specific rotation position, the first ventilation hole 53b1 is formed on the upper annular area 53b of the taking lens 53 of the third group, and the second ventilation hole 55c1 is formed on the lower surface 55c of the barrel 55. In contrast, in the lens assembly 60 according to the sixth embodiment, of the ventilation holes, which communicate with each other only when the taking lens 63 of the third group is at the specific rotation position, the first ventilation hole 65b1 may be formed on the upper surface 65b of the barrel 65, and the second ventilation hole 63c1 may be formed on the lower annular area 63c of the taking lens 63 of the third group.

Furthermore, when the lenses or the barrel is made of plastic, the lenses or the barrel can be formed into a "processed" shape at the time of molding. Therefore, "processing" is not needed.

Figure 11:
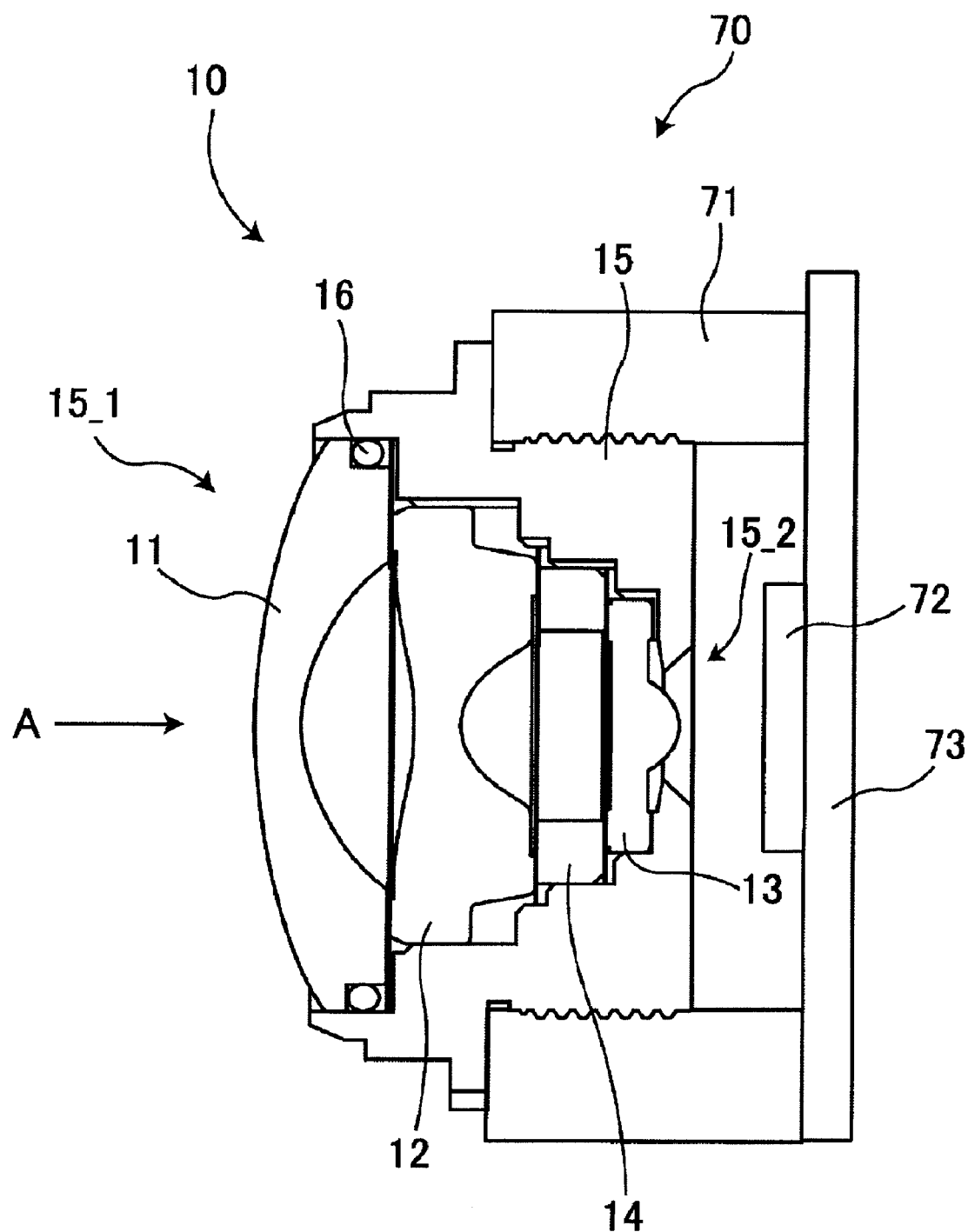
FIG. 11 is a sectional view illustrating a camera unit having the lens assembly shown in FIG. 1.
Figure 12:
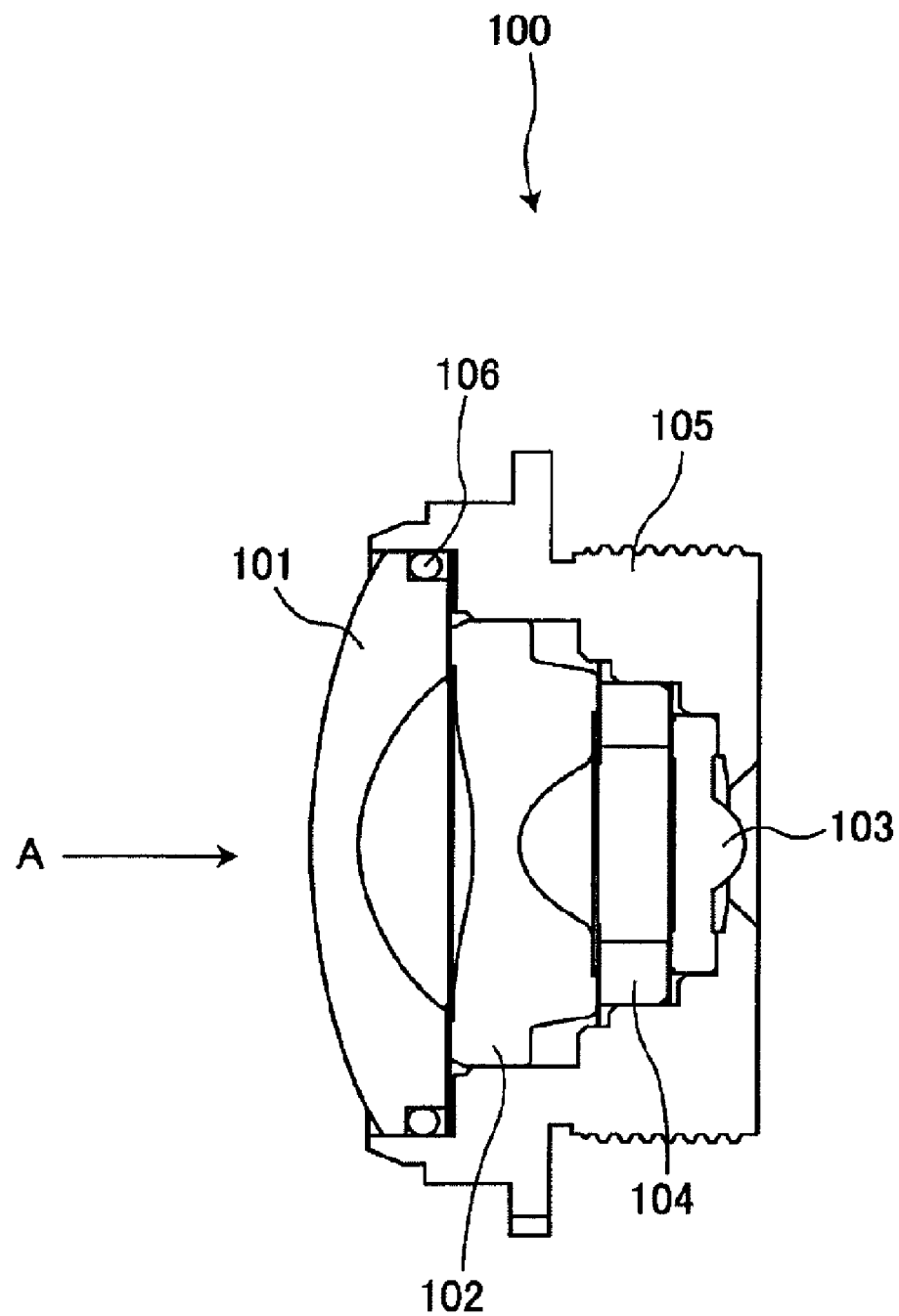
FIG. 12 is a view illustrating a section of a related-art lens assembly, in which the section includes an optical axis of a taking lens.
Figure 13:
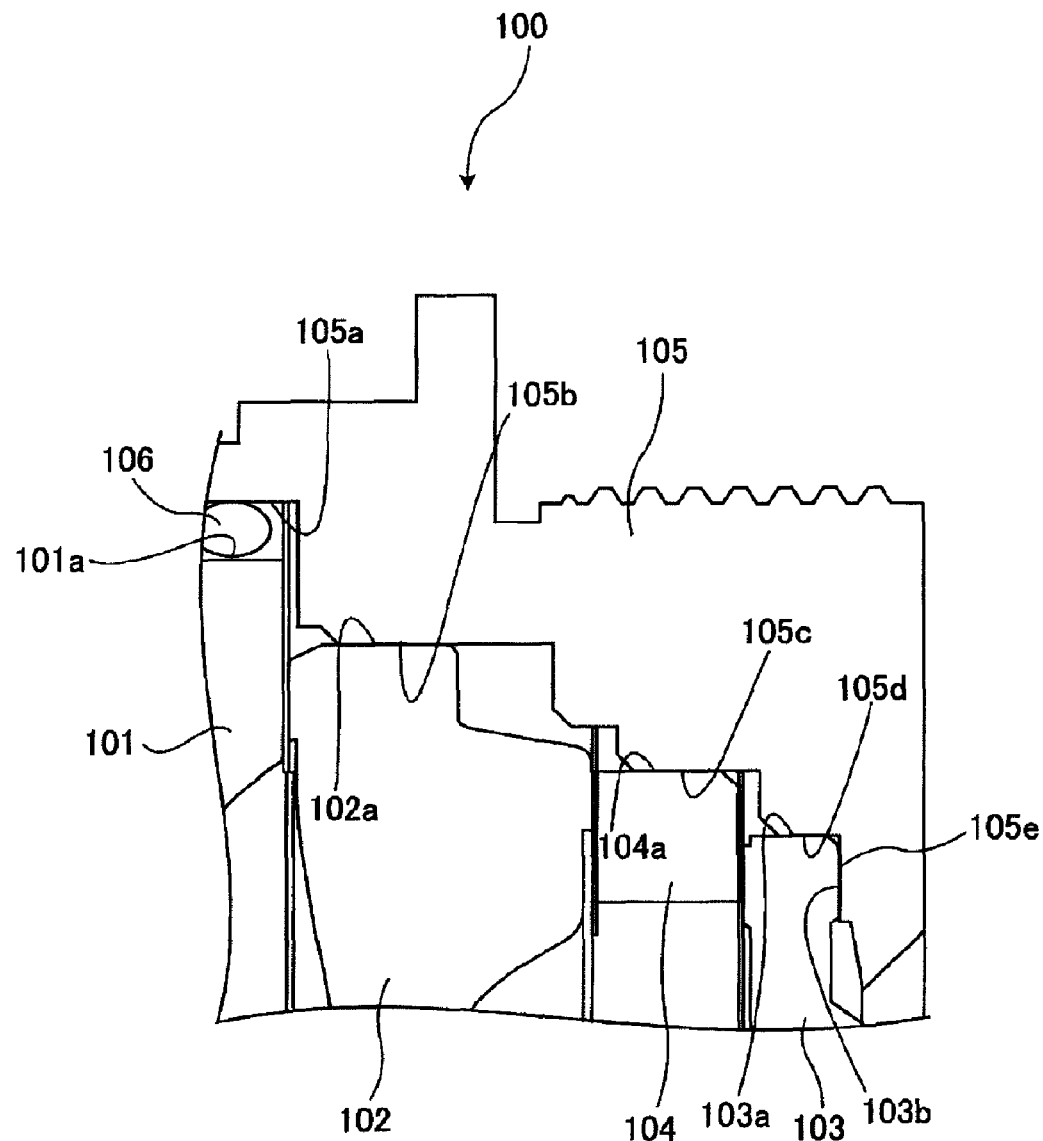
FIG. 13 is an enlarged sectional view illustrating a part of the lens assembly shown in FIG. 12, in which the taking lens, a spacer ring, and the barrel are in close contact with each other.

FIG. 11 is a sectional view illustrating a camera unit having the lens assembly shown in FIG. 1.

The camera unit 70 shown in FIG. 11 is an imaging apparatus according to an embodiment of the invention. The camera unit 70 includes the lens assembly 10 shown in FIG. 1, a camera body frame 71, and a substrate 73 on which the imaging device 72 such as CCD is mounted.

To assemble the camera unit 70, the lens assembly 10 is fixedly adhered to the camera body frame 71 by inserting the lens assembly 10 into the camera body frame 71 (by threadedly engaging a male screw portion, which is formed on the outer peripheral surface of the barrel 15, onto a female screw portion which is formed on the inner peripheral surface in the camera body frame 71). At this time, by coating an adhesive between the outer periphery of the lens frame and the anterior end of the camera body frame 71, waterproof treatment is performed so as to prevent water from penetrating into the camera unit 70 from the anterior end side thereof. Furthermore, the substrate 73 on which the imaging device 72 such as CCD is mounted is fixedly adhered to the camera body frame 71.

What is claimed is:

1. A lens assembly comprising:
   a plurality of optical members; and
   a barrel that is formed in a hollow shape and has an object-side opening and an image-side opening, wherein
   the plurality of optical members are mounted into the barrel in order according to a rule that if one optical member is to be disposed closer to an object side than another optical member, the one optical member is mounted later than that said another optical member, wherein
   before an most-object-side optical member among the plurality of optical members is mounted in the barrel, a ventilation channel passing from the object-side opening to the image-side opening is provided to pass between optical members other than the most-object-side optical member and an inner surface of the barrel.

2. The lens assembly according to claim 1, wherein an O-ring is provided between an outer peripheral surface of the most-object-side optical member and the inner surface of the barrel.

3. The lens assembly according to claim 1, wherein
   the image-side opening has a diameter smaller than an outer diameter of a most-image-side optical member among the plurality of optical members,
   the barrel has a wall surface, inside the image-side opening, configured to be in contact with an annular area that is a periphery of an image-side surface of the most-image-side optical member,
   a ventilation hole that communicate with each other only when the most-image-side optical member is located at a specific rotation position are formed by the wall surface and the annular area of the most-image-side optical member, and
   the most-image-side optical member has a rotating hole into which a leading end of a jig configured to be inserted from the image-side opening to rotate the most-image-side optical member is inserted.

4. The lens assembly according to claim 2, wherein
the image-side opening has a diameter smaller than an outer diameter of a most-image-side optical member among the plurality of optical members,
the barrel has a wall surface, inside the image-side opening, configured to be in contact with an annular area that is a periphery of an image-side surface of the most-image-side optical member,
a ventilation hole that communicate with each other only when the most-image-side optical member is located at a specific rotation position are formed by the wall surface and the annular area of the most-image-side optical member, and
the most-image-side optical member has a rotating hole into which a leading end of a jig configured to be inserted from the image-side opening to rotate the most-image-side optical member is inserted.

5. An imaging apparatus comprising:
the lens assembly according to claim 1; and
an imaging device.

6. An imaging apparatus comprising:
the lens assembly according to claim 2; and
an imaging device.

7. An imaging apparatus comprising:
the lens assembly according to claim 3; and
an imaging device.

8. An imaging apparatus comprising:
the lens assembly according to claim 4; and
an imaging device.

9. The lens assembly according to claim 1, wherein
a ventilation hole that communicate with each other only when the most-image-side optical member is located at a specific rotation position are formed by the wall surface and the annular area of the most-image-side optical member, and
the most-image-side optical member has a rotating hole into which a leading end of a jig configured to be inserted from the image-side opening to rotate the most-image-side optical member is inserted.

10. The lens assembly according to claim 1, wherein
a ventilation hole that communicate with each other only when the most-image-side optical member is located at a specific rotation position are formed by the wall surface and the annular area of the most-image-side optical member.

11. The lens assembly according to claim 1, wherein
the most-image-side optical member has a rotating hole into which a leading end of a jig configured to be inserted from the image-side opening to rotate the most-image-side optical member is inserted.

12. The lens assembly according to claim 1, wherein
each optical member of the plurality of optical members is an optical lens.

13. The lens assembly according to claim 1, wherein
the ventilation channel is formed such that the ventilation channel has an opening to the outside of the lens assembly so that air can pass from an area of the hollow shape of the barrel to the outside of the lens assembly.

14. A lens assembly comprising:
a barrel that is formed in a hollow shape and has an object-side opening and an image-side opening, wherein a plurality of optical members are mountable into the barrel; and
a ventilation channel passing from the object-side opening to the image-side opening, wherein the ventilation channel is provided to pass between optical members other than an optical member closest to the object-side opening.

15. The lens assembly according to claim 14, wherein
the image-side opening has a diameter smaller than an outer diameter of an optical member closest to the image-side opening among the plurality of optical members,
the barrel has a wall surface, inside the image-side opening, configured to be in contact with an annular area that is a periphery of an image-side surface of the optical member closest to the image-side opening,
a ventilation hole that communicate with each other only when the optical member closest to the image-side opening is located at a specific rotation position are formed by the wall surface and the annular area of the optical member closest to the image-side opening, and
the optical member closest to the image-side opening has a rotating hole into which a leading end of a jig configured to be inserted from the image-side opening to rotate the optical member closest to the image-side opening is inserted.

16. The lens assembly according to claim 14, wherein
a ventilation hole that communicate with each other only when an optical member closest to the image-side opening is located at a specific rotation position are formed by the wall surface and the annular area of the optical member closest to the image-side opening, and
the optical member closest to the image-side opening has a rotating hole into which a leading end of a jig configured to be inserted from the image-side opening to rotate the optical member closest to the image-side opening is inserted.

17. The lens assembly according to claim 14, wherein
a ventilation hole that communicate with each other only when an optical member closest to the image-side opening is located at a specific rotation position are formed by the wall surface and the annular area of the optical member closest to the image-side opening.

18. The lens assembly according to claim 14, wherein
an optical member closest to the image-side opening has a rotating hole into which a leading end of a jig configured to be inserted from the image-side opening to rotate the optical member closest to the image-side opening is inserted.

19. The lens assembly according to claim 14, wherein
the ventilation channel is formed such that the ventilation channel has an opening to the outside of the lens assembly so that air can pass from an area of the hollow shape of the barrel to the outside of the lens assembly.

* * * * *